Jan. 29, 1935. A. Y. DODGE 1,989,131
LUBRICATING DEVICE
Filed Oct. 15, 1932   2 Sheets-Sheet 1

INVENTOR.
ADIEL Y. DODGE
BY
ATTORNEY.

Jan. 29, 1935.  A. Y. DODGE  1,989,131
LUBRICATING DEVICE
Filed Oct. 15, 1932   2 Sheets—Sheet 2

INVENTOR.
ADIEL Y. DODGE
BY
ATTORNEY.

Patented Jan. 29, 1935

1,989,131

UNITED STATES PATENT OFFICE 1,989,131

LUBRICATING DEVICE

Adiel Y. Dodge, South Bend, Ind., assignor to The Lubrication Corporation, South Bend, Ind., a corporation of Delaware Application October 15, 1932, Serial No. 637,919

7 Claims. (Cl. 285—161)

This invention relates to improvements in lubricating devices and more particularly to lubricant discharge nozzles for servicing lubricant receiving fittings.

An object of the invention is to provide a lubricant discharge nozzle having a pliant annular sealing member adapted to embrace an area of the fitting head and to conform in contour with the contacted surface of the fitting to form a lubricant tight seal therebetween.

Another object is to provide a lubricant discharge nozzle as described wherein the degree of compression of the pliant sealing member during engagement of the nozzle with a fitting is maintained within the maximum limit of compressibility of the member.

A further object is to provide a lubricant discharge nozzle as described having a non-yielding area disposed within the confines of the pliant sealing member for contacting the fitting under nozzle thrust provided with a lubricant discharge orifice therethrough formed to maintain communication with the fitting inlet port throughout a wide angular range in at least one plane.

A still further object is to provide a lubricant discharge nozzle having a pliant and compressible sealing member wherein the member is so confined as to permit relatively high mechanical or fluid pressure to be applied thereto without fear of distortion.

Other objects, the advantages and uses of the invention, will be, or should become apparent after reading the following description and claims and after consideration of the accompanying drawings forming a part of this specification, in which:

In general, the lubricant discharge nozzles selected for illustration herein comprise a body member A having a lubricant passage B enlarged and internally threaded at its rearward end C for connecting the nozzle to a source of lubricant supply (not shown), a rigid fitting contacting area D formed on the body member A having a discharge opening E therethrough communicating with the passage B and a pliant annular sealing member F surrounding the area D for embracing a portion of the head G of a lubricant receiving fitting H and providing a self-conforming annular sealing contact between the nozzle and the fitting head upon relative thrust between the nozzle and fitting.

All of the nozzles selected for illustration are of a design for use with a fitting H of which the head or nozzle engaging portion G is spherical in contour thereby providing for a relatively wide angular range of movement of the nozzle about the center of the fitting head. The nozzles are so constructed as to take advantage of this feature although attention is called to the fact that the features of the nozzle and more particularly the sealing instrumentality may be embodied in nozzles of the type designed for use with other than spherical headed fittings.

Figure 1:
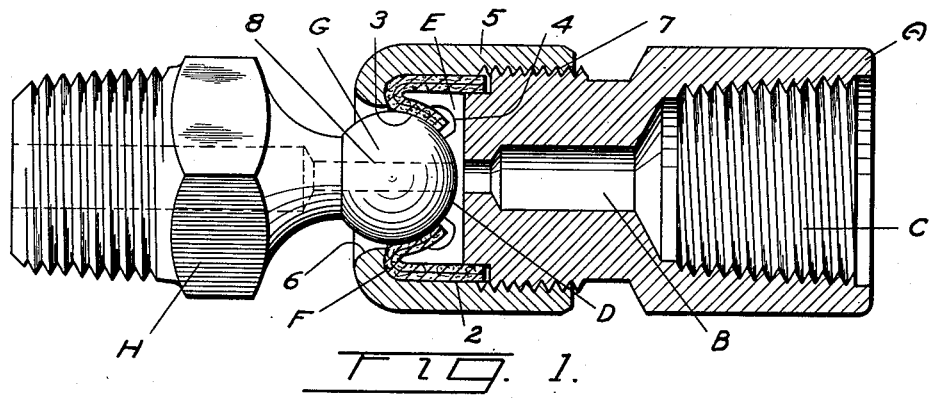
Fig. 1 is a sectional elevation of a lubricant discharge nozzle constructed in accordance with the invention as it appears during the servicing of a lubricant receiving fitting.
Figure 2:
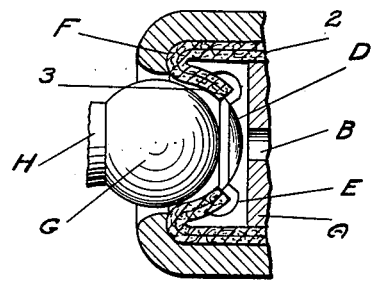
Fig. 2 is a fragmentary view of the nozzle of Fig. 1 disengaged from the fitting.
Figure 3:
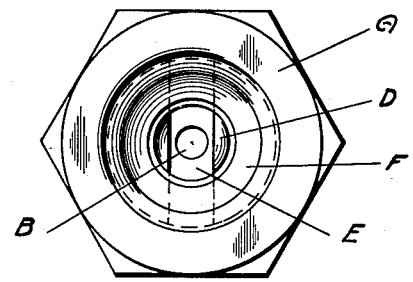
Fig. 3 is a front elevation of the nozzle of Fig. 1.

In Figs. 1 to 3, inclusive, the nozzle illustrated therein employs a sealing member F of relatively thin pliant material, preferably rawhide, preformed to provide a rearwardly extending skirt 2 disposed about the forward end of the body A and extending inwardly and rearwardly at its foremost end to provide an annular fitting engaging portion 3 located within an annular cavity 4 formed about the rigid contact area D. A bushing 5 having an overhanging flange 6 at its forward end is provided for securing the member F in place upon the body A by the disposition of the bushing about the outer wall of the skirt 2 and in drawing the bushing into engagement with the sealing member through the medium of cooperating screw threads 7 on the bushing and body member respectively. The contact area D is spherical and concave to conform with and receive a portion of the spherical head G of the fitting. The cavity 4 is of gradually increasing depth as it approaches the area D, having its major portion deeper than the normal thickness of the sealing member F so that lubricant under pressure may act upon at least a part of the portion 3 of the sealing member to urge it into close contact with the outer wall of the fitting head. In the nozzle of Figs. 1 to 3 as well as that of Figs. 4 to 6 the discharge orifice E of the nozzle comprises a slot formed diametrically across the entire portion of that part of the body A extending within the annular sealing member F, thereby intersecting the contact area D and, in addition, in the nozzle of Fig. 1, the annular cavity 4.

In operation, the nozzle may be held in the hand of the operator or if connected directly to a rigid conduit or gun by manual grasp of the conduit or gun so that the discharge or forward end of the nozzle may be directed upon the head G of the fitting H. A forward thrust applied along the axis of the nozzle subsequent to its initial engagement with the fitting may then cause the contact area D to abut the surface of the fitting head, thus arresting further axial movement of the nozzle. As the nozzle is thrust forwardly upon the fitting head that portion of the sealing member F lying in the shallow and outer region of the cavity 4 may become compressed to form an annular sealing contact with the outer surface of the fitting head. Upon the admission of lubricant under pressure to the nozzle that part of the sealing member disposed in the deeper portion of the cavity 4 may be urged against the fitting head to augment the lubricant seal between nozzle and fitting afforded by the compression of the sealing member as aforedescribed.

It will be noted that during the servicing operation, with the parts assembled as shown in Fig. 1, that a considerable range of angular movement between the nozzle and fitting head may be had in that plane including the discharge orifice E formed by diametrically slotting the end of the body A through the contact area D. This is due to the fact that the inlet port 8 of the fitting located centrally of the head G may continue in registration with some portion of the elongated discharge orifice as the nozzle is moved over the head in the plane of the orifice.

There is thus provided in the nozzle as described several outstanding features among the more important of which is the self-adjusting of the pliant sealing member F to the head G of the fitting. This feature at once overcomes the possibility of an improper seal between the nozzle and fitting due to irregularities in head contour, abrasions, nicks or other forms of head mutilation. The confining of the member F within rigid lateral supporting walls permits of the application of greater thrust to the nozzle with increased compression of the sealing member, thus affording a more efficient lubricant tight seal.

Figure 4:
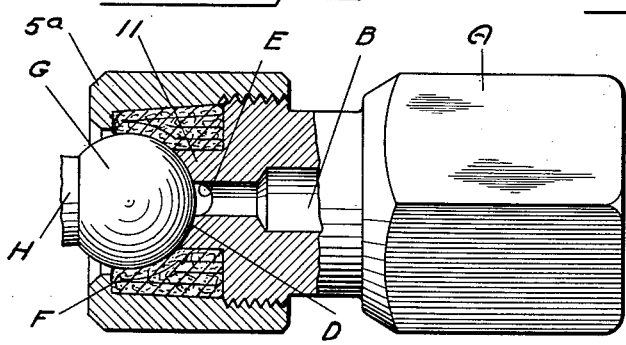
Fig. 4 is a sectional elevation of another form of the nozzle during a servicing operation.
Figure 5:
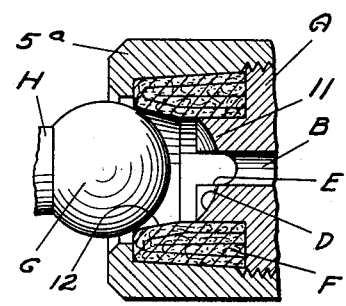
Fig. 5 is a fragmentary view of the nozzle of Fig. 4 disengaged from the fitting.
Figure 6:
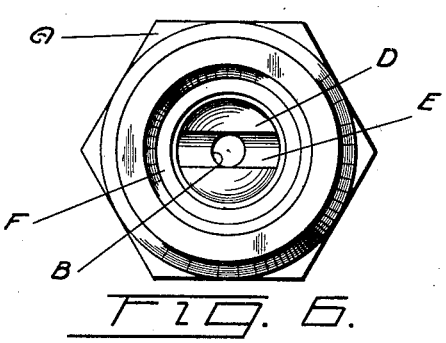
Fig. 6 is a front elevation of the nozzle of Fig. 4.

In Figs. 4 to 6 inclusive, another form of the nozzle is shown wherein the forward end 11 of the body member A is reduced in diameter to that of the contact area D and wherein the annular sealing member F is of relatively thick walled pliant material such as rawhide or composition. As may be best seen in Fig. 5, the member F extends forwardly of the portion 11 of the body A and is flared outwardly on its inner wall at 12 to, in general, follow the increasing thickness of the fitting head G as it approaches its mid-portion. A bushing 5a, similar to the bushing 5, may be employed to secure the member F in place upon the nozzle end and to confine its lateral and forward wall portions against distortion and displacement when the sealing member is compressed as in servicing a fitting.

In operation, this form of the nozzle provides, by virtue of the self-confining characteristic of the sealing member F, a tight annular seal between the nozzle and fitting head about that portion of the head engaged with the contact area D. The elongated discharge orifice E assures of communication between the nozzle and fitting port 8 over a relatively wide range of angular movement. Replacement of the member F may be readily carried out by merely unscrewing the bushing 5a from the body A.

In Figs. 7 to 12 inclusive, two other forms of the nozzle are shown which possess the additional feature of simplicity in construction. In each of these forms the sealing member F comprises an annulus of pliant material, rawhide or composition as preferred, having flat end walls and disposed entirely within enlarged bores 15 formed in the end wall of the body member A. The internal diameter of the annular sealing members is considerably less than the diameter of the fitting head so that as the members are thrust against the fitting head, during the servicing operation, the inner walls of the sealing members are caused to expand and compress the material thereof.

Figure 7:
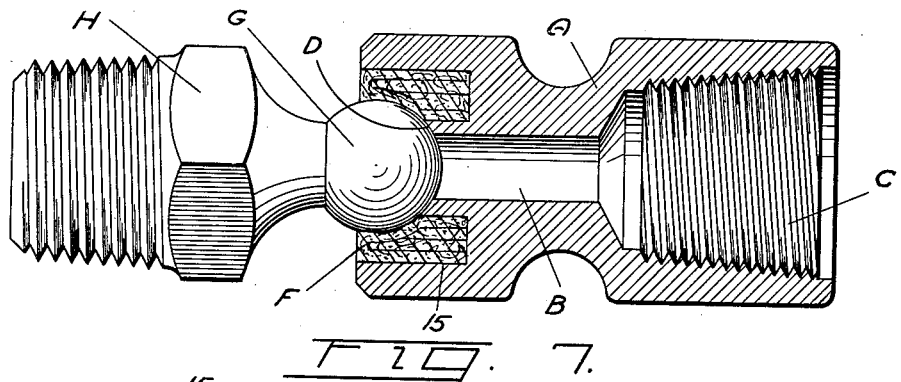
Fig. 7 is a sectional elevation of further form of the nozzle during a servicing operation.
Figure 8:
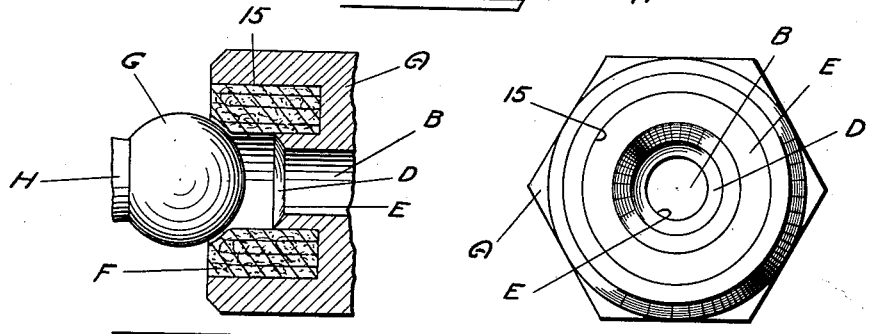
Fig. 8 is a fragmentary view of the nozzle of Fig. 7 disengaged from the fitting.
Figure 9:
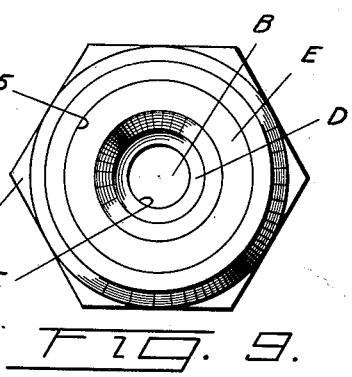
Fig. 9 is a front elevation of the nozzle of Fig. 7.

In that form of the nozzle shown in Figs. 7 to 9 inclusive, the contact area D is formed upon the end of a tubular extension of the body communicating with the passage B and extending well into the enlarged bore 15 and within the interior walls of the sealing member F.

Figure 10:
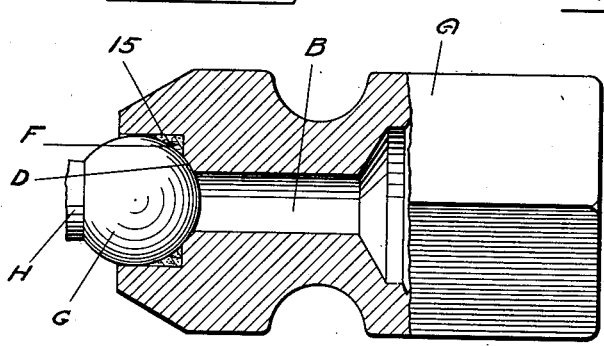
Fig. 10 is a sectional elevation of a further form of the nozzle during a servicing operation.
Figure 11:
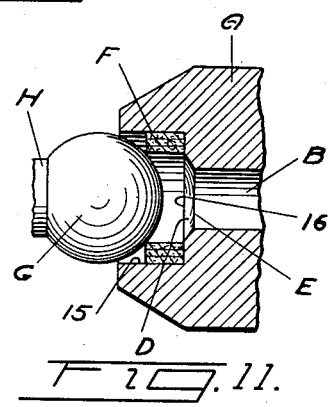
Fig. 11 is a fragmentary view of the nozzle of Fig. 10 disengaged from the fitting.
Figure 12:
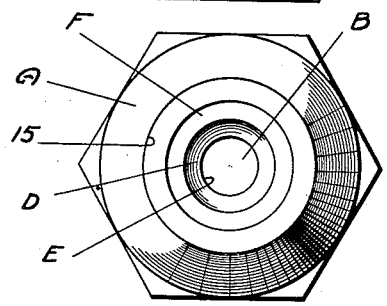
Fig. 12 is a front elevation of the nozzle of Fig. 10.

In the nozzle of Figs. 10 to 12 inclusive, the contact area D is formed about the mouth of the passage B on the inner end wall 16 of the enlarged bore 15 of the body.

It is to be understood that the described embodiments of the invention herein set forth are presented for the purpose of illustration only and various changes may be made therein without departing from the spirit and scope of the invention.

I claim:

1. A lubricant discharge nozzle for servicing a lubricant receiving fitting comprising, a conduit adapted at one end for connection with a source of lubricant supply and presenting at its other end a surface fashioned to follow the contour of the nozzle engaging portion of said fitting to provide intimate contact with the surface of the fitting during the servicing operation, said surface having a cross-sectionally elongated discharge opening therein communicating with the lubricant passageway of the conduit, and a pliant annular seal located about said surface for sealing engagement with said fitting in a zone surrounding the engaging areas of said conduit and said fitting.

2. A lubricant discharge nozzle for servicing a lubricant receiving fitting having a spherical head comprising, means providing a lubricant conducting passageway terminating at one end in a discharge orifice and adapted at its opposite end for connection with a source of lubricant supply, an annular compressible sealing member surrounding said discharge orifice for establishing a lubricant tight seal between said nozzle and said fitting head when thrust is applied to the nozzle in the direction of the fitting, and means engageable with the outer spherical surface of the fitting during a servicing operation thereof operable to locate the head centrally of the sealing member.

3. A lubricant discharge nozzle, for servicing a lubricant receiving fitting having a spherical head comprising, means providing a lubricant conducting passageway terminating at one end in a discharge orifice and adapted at its opposite end for connection with a source of lubricant supply, an annular compressible sealing member surrounding said discharge orifice for establishing a lubricant tight seal between said nozzle and said fitting head when thrust is applied to the nozzle in the direction of the fitting, and means engageable with the outer spherical surface of the fitting during a servicing operation thereof operable to locate the head centrally of the sealing member, said fitting engaging means being so disposed with respect to said sealing member as to arrest movement of the nozzle under said thrust prior to the compression of said sealing member beyond a predetermined degree.

4. A lubricant discharge nozzle, for servicing a lubricant receiving fitting having a spherical head comprising, means providing a lubricant conducting passageway terminating at one end in a discharge orifice and adapted at its opposite end for connection with a source of lubricant supply, an annular compressible sealing member surrounding said discharge orifice for establishing a lubricant tight seal between said nozzle and said fitting head when thrust is applied to the nozzle in the direction of the fitting, and a non-yielding concave spherical abutment surface on said nozzle engageable with said fitting head for locating the head centrally of the sealing member.

5. A lubricant discharge nozzle for servicing a lubricant fitting having a nozzle engaging head comprising, means providing a lubricant conducting passageway terminating at one end in a discharge orifice and adapted at its opposite end for connection with a source of lubricant supply, an annular compressible sealing member surrounding said discharge orifice for establishing a lubricant tight seal between said nozzle and a surface of said fitting head when thrust is applied to the nozzle in the direction of the fitting, and means engageable with the surface of the fitting head during a servicing operation of the fitting operable to locate the head centrally of the sealing member.

6. A lubricant discharge nozzle for servicing a lubricant receiving fitting having a spherical head comprising, means providing a lubricant conducting passageway terminating at one end in a discharge orifice and adapted at its opposite end for connection with a source of lubricant supply, an annular compressible sealing member surrounding said discharge orifice for establishing a lubricant tight seal between said nozzle and said fitting head when thrust is applied to the nozzle in the direction of the fitting, and means engageable with the outer spherical surface of the fitting during a servicing operation thereof operable to locate the head centrally of the sealing member, said last named means including a rigid tubular member forming a part located within said annular sealing member and terminating short of the outermost face of said sealing member.

7. A lubricant discharge nozzle for servicing a lubricant receiving fitting having a nozzle engaging head, comprising, a conduit providing a lubricant conducting passageway terminating at one end in a discharge orifice and arranged at its opposite end for connection with a source of lubricant supply, an annular compressible sealing member surrounding said discharge orifice for establishing a lubricant tight seal between said nozzle and a surface of said fitting head when thrust is applied to the nozzle in the direction of the fitting, the discharge end of said conduit presenting a rigid annular abutment surface surrounding the discharge port of the conduit fashioned to engage with that portion of the fitting introduced within the confines of the sealing member thereby to limit movement of the nozzle in the direction of the fitting under the said applied thrust.

ADIEL Y. DODGE.